(12) United States Patent
Weber

(10) Patent No.: US 11,842,575 B2
(45) Date of Patent: Dec. 12, 2023

(54) METHOD AND SYSTEM FOR VEHICLE ANALYSIS

(71) Applicant: WIRETRONIC AB, Vänersborg (SE)

(72) Inventor: Christoffer Weber, Vänersborg (SE)

(73) Assignee: WIRETRONIC AB, Vänersborg (SE)

( * ) Notice: Subject to any disclaimer, the term of this patent is extended or adjusted under 35 U.S.C. 154(b) by 821 days.

(21) Appl. No.: 16/346,934

(22) PCT Filed: Nov. 7, 2017

(86) PCT No.: PCT/SE2017/051108
§ 371 (c)(1),
(2) Date: May 2, 2019

(87) PCT Pub. No.: WO2018/088949
PCT Pub. Date: May 17, 2018

(65) Prior Publication Data
US 2020/0066062 A1 Feb. 27, 2020

(30) Foreign Application Priority Data
Nov. 14, 2016 (SE) .................... 1651485-3

(51) Int. Cl.
*G07C 5/00* (2006.01)
*G06F 16/21* (2019.01)
*G05B 23/02* (2006.01)
*G06N 3/04* (2023.01)
*G06N 3/08* (2023.01)

(52) U.S. Cl.
CPC ......... *G07C 5/008* (2013.01); *G05B 23/0254* (2013.01); *G06F 16/212* (2019.01); *G06N 3/04* (2013.01); *G06N 3/08* (2013.01)

(58) Field of Classification Search
CPC ... G07C 5/008; G06F 16/212; G05B 23/0254; G06N 3/04; G06N 3/08
USPC ...................................................... 701/31.4
See application file for complete search history.

(56) References Cited

U.S. PATENT DOCUMENTS

| 5,729,452 A | 3/1998 | Smith et al. |
|---|---|---|
| 7,096,101 B2 | 8/2006 | Sonnenrein et al. |
| 8,903,593 B1 * | 12/2014 | Addepalli ......... H04W 52/0206 |
| | | 701/30.6 |
| 2002/0007237 A1 | 1/2002 | Phung et al. |
| 2005/0273277 A1 | 12/2005 | Ridnour et al. |

(Continued)

FOREIGN PATENT DOCUMENTS

| EP | 1717651 A2 | 11/2006 |
|---|---|---|
| WO | 2015139709 A1 | 9/2015 |

OTHER PUBLICATIONS

Extended European Search Report dated Jun. 2, 2020 for EP Application No. 17870407.8, 8 pages.

(Continued)

*Primary Examiner* — Tyler J Lee
*Assistant Examiner* — Tiffany P Ohman
(74) *Attorney, Agent, or Firm* — RMCK Law Group, PLC (57) ABSTRACT

The present invention generally relates to a novel concept of analyzing vehicle data for determining e.g. a status of component comprised with the vehicle, specifically by correlating collected vehicle diagnosis data. The invention also relates to a corresponding system and a computer program product. In addition, the invention additionally relates to an arrangement for collecting said vehicle diagnosis data.

17 Claims, 5 Drawing Sheets

(56) References Cited

U.S. PATENT DOCUMENTS

2008/0114502 A1\* 5/2008 Breed ................ G02B 27/01
 701/2
2016/0035152 A1 2/2016 Kargupta
2017/0099200 A1\* 4/2017 Ellenbogen ............ H04L 67/10

OTHER PUBLICATIONS

PCT International Search Report and Written Opinion dated Mar. 19, 2018 for International Application No. PCT/SE2017/051108, 9 pages.

\* cited by examiner

METHOD AND SYSTEM FOR VEHICLE ANALYSIS

CROSS-REFERENCE TO RELATED APPLICATIONS

This application is a 371 U.S. National Stage of International Application No. PCT/SE2017/051108, filed Nov. 7, 2017, which claims priority to Swedish Patent Application No. 1651485-3, filed Nov. 14, 2016. The disclosures of each of the above applications are incorporated herein by reference in their entirety.

TECHNICAL FIELD

The present invention generally relates to a novel concept of analyzing vehicle data for determining e.g. a status of component comprised with the vehicle, specifically by correlating collected vehicle diagnosis data. The invention also relates to a corresponding system and a computer program product. In addition, the invention additionally relates to an arrangement for collecting said vehicle diagnosis data.

BACKGROUND OF THE INVENTION

Recent advances in computers and communications have had impact on how to control and operate a general vehicle. As a consequence, increasingly sophisticated processor based tools may be found throughout auto body and auto maintenance facilities, and today, more and more of those devices communicate data back and forth with other similar devices and/or with host computers and various remote terminals. The communications facilitate diagnostics and repair as well as communications with office equipment, e.g. to facilitate order processing and invoicing for completed work.

An exemplary implementation of such a tool is disclosed in U.S. Pat. No. 7,096,101. In U.S. Pat. No. 7,096,101, vehicle diagnosis data is collected and transmitted to an external service center, where personnel at the service center may be able to provide additional assistance as compared to what is achievable at normal auto body and auto maintenance facilities. Even though U.S. Pat. No. 7,096,101 provides some improvements as compare to allowing the workshop operators to act on their own, the of the large amount of vehicle analysis data generated during e.g. operation of the vehicle will in reality be to complex also for the personnel at the service center to comprehend. Thus, the personnel at the service center will have to resort to provide the workshop operators with a "best guess", typically only based on gut feeling and previous knowledge of similar problems.

Accordingly, there seems to be room for further improvements in how the large amount of vehicle diagnosis data should be handled, either within the workshop or e.g. by an external expert, providing the possibility of generating a valid indication of a current status of a vehicle component comprised with the vehicle. In addition, there would be desirable to provide some form of arrangement that would allow for swift collection and storage of further data from the vehicle, as compared to what is possible using for example the arrangement as is disclosed in U.S. Pat. No. 7,096,101.

SUMMARY OF THE INVENTION

In view of above-mentioned and other drawbacks of the prior art, it is an object of the present invention to provide improvements in relation to vehicle analysis.

According to an aspect of the present invention, it is therefore provided a method for analyzing vehicle diagnosis data generated by a first vehicle, the method comprising receiving a first collection of vehicle diagnosis data, the vehicle diagnosis data comprising a plurality of different sets of digital data representing a plurality of vehicle components comprised with the vehicle, performing a modeling of the first collection of vehicle diagnosis data by correlating at least selected portion of the different sets of data comprised with the first collection of vehicle diagnosis data, and forming, based on the performed modeling, an indication of a status for at least one of the vehicle components comprised with the vehicle.

In accordance to the invention, there is provided a methodology for processing sensor data collected from a plurality of different vehicle components, for example comprising data relating to a vehicle transmission, instrument cluster, climate control system, trip computers, power seats, where the sensor data from the different vehicle components are correlated with each other for the purpose of trying to find a behavior being indicative of a status for at least one of the included vehicle components. The present invention is based upon the realization that the correlation aspect may be exploited for understanding the behavior of a specific vehicle component. That is, rather than only relying on a single e.g. error code relating to a specific vehicle component, the overall behavior for a plurality of vehicle components is taken into account for determining an indication of a status for a single vehicle component. It should be understood that the vehicle diagnosis data preferably is collected over time, forming a time series of vehicle diagnosis data.

Thus, the present invention applies data mining of the vehicle diagnosis data where for example a model based on an artificial intelligence approach may be used for identifying a possible problematic vehicle behavior. In a possible embodiment, patterns for "normal vehicle behavior" and "problematic vehicle behavior" may be are derived by frequently processing the combined data using machine learning and data mining methods. In addition to the above example, speed, engine revolutions, engine temperature, engine torque, environmental temperature, fuel consumption and emission values may be analyzed to detect normal and abnormal behavior.

In line with the present invention, the method further comprises determining a validity of the status for the at least one vehicle component is determined to be above a predetermined threshold. Accordingly, the indication may be provided with appended information stating if the indication is to be treated as reliable or unreliable. Further process, for example for acting on the provided indication are preferably adapted to take into account said validity.

Within the context of the present invention, the different sets of data may be generated from at least one of a CAN bus information flow, a diagnostic information flow, and analogue signals collected from the vehicle. Accordingly, it may in line with the invention also be possible to combine data from different "sources", i.e. analogue signals (such as an intermediate current/voltage level for a first vehicle component) may be combined with an error code (for a second vehicle component).

In the most common implementation of the invention, the indication of the status for the at least one vehicle component relates to an error relating to the vehicle component, such as for example relating to a short-circuit, a broken connection, and a corrosion in a connector, a broken vehicle component, a vehicle component not functioning according to a predetermined pattern, etc. However, in some embodiments it may also be possible to form a "model" of how a specific vehicle component behaves when in a loaded/used state or in an unloaded/unused state, etc.

As indicated above, the modeling comprises applying a machine learning process to the selected portion of the different sets of data comprised with the first collection of vehicle diagnosis data. The machine learning process may be either of an unsupervised machine learning process or a supervised machine learning process. In employing the supervised approach it may be desirable to perform the modeling by accessing a digital storage unit comprising previously stored collection of training vehicle diagnosis data, and comparing the collection of training vehicle diagnosis data with the first collection of vehicle diagnosis data. The training vehicle data may be previously collected vehicle diagnosis data (to be compared to the above mentioned normal vehicle behavior) from the "same" vehicle, or may be data generated by a "second" vehicle. Alternatively, the training vehicle diagnosis data may reside from previously generated data, for example formed in a simulation process.

According to an aspect of the invention, there is further provided a vehicle analysis system for analyzing vehicle diagnosis data generated by a first vehicle, the system comprising a control unit configured to receive a first collection of vehicle diagnosis data, the vehicle diagnosis data comprising a plurality of different sets of digital data representing a plurality of vehicle components comprised with the vehicle, perform a modeling of the first collection of vehicle diagnosis data by correlating at least selected portion of the different sets of data comprised with the first collection of vehicle diagnosis data, and form, based on the performed modeling, an indication of a status for at least one of the vehicle components comprised with the vehicle. This aspect of the invention provides similar advantages as discussed above in relation to the previous aspects of the invention.

Advantageously, the vehicle analysis system further comprises an arrangement for interfacing with and collecting the vehicle diagnosis data, such as for example is exemplified below. It should however be understood that the vehicle analysis system also be function on "offline data", i.e. previously collected and then processed. This will be further elaborated below in the detailed description of the invention.

According to a further aspect of the present invention, there is provided a non-transitory computer readable medium having stored thereon computer program means for controlling a vehicle analysis system, wherein the computer program product comprises code for receiving a first collection of vehicle diagnosis data, the vehicle diagnosis data comprising a plurality of different sets of digital data representing a plurality of vehicle components comprised with the vehicle, code for performing a modeling of the first collection of vehicle diagnosis data by correlating at least selected portion of the different sets of data comprised with the first collection of vehicle diagnosis data, and code for forming, based on the performed modeling, an indication of a status for at least one of the vehicle components comprised with the vehicle. Also this aspect of the invention provides similar advantages as discussed above in relation to the previous aspects of the invention.

A software executed by the server for operation in accordance to the invention may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

In summary, the present invention generally relates to a novel concept of analyzing vehicle data for determining e.g. a status of component comprised with the vehicle, specifically by correlating collected vehicle diagnosis data. The invention also relates to a corresponding system and a computer program product. In addition, the invention additionally relates to an arrangement for collecting said vehicle diagnosis data.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout. The following examples illustrate the invention and are not intended to limit the same.

Figure 1:
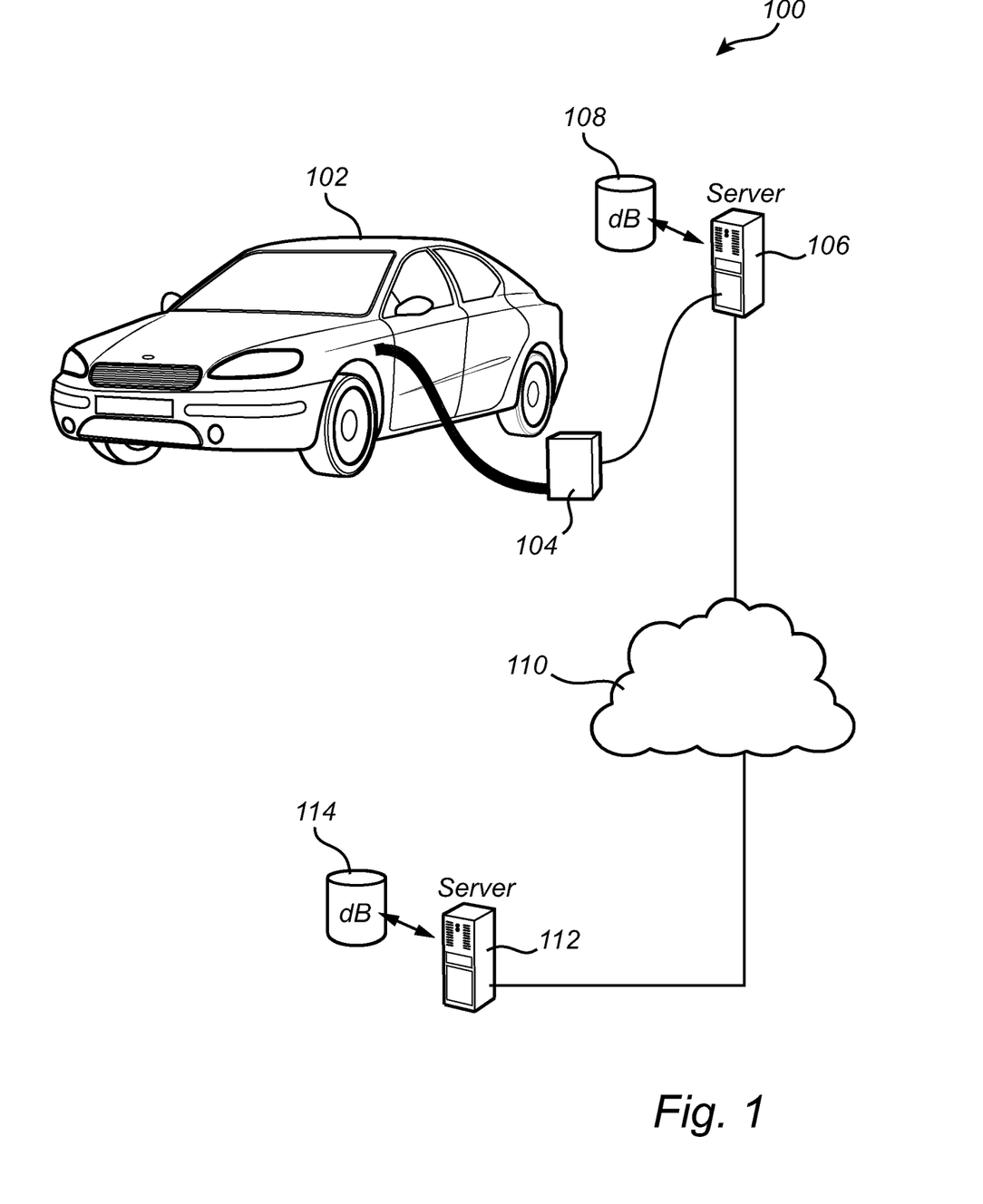
FIG. 1 conceptually illustrates a vehicle analysis system according to an embodiment of the invention connected to a vehicle.

Turning now to the drawings and to FIG. 1 in particular, there is conceptually illustrated a vehicle analysis system 100 according to an embodiment of the invention, connected to an exemplary first vehicle 102. The purpose of the vehicle analysis system 100 is, in one embodiment, to dynamically analyze vehicle diagnosis data generated by a plurality of vehicle components comprised with the vehicle 102. In the present embodiment, the vehicle components are at least partly equipped with sensors for collecting vehicle diagnosis data relating to, for example, a vehicle transmission, instrument cluster, climate control system, trip computers, power seats, vehicle speed, vehicle engine revolutions, vehicle engine temperature, vehicle engine torque, environmental temperature, fuel consumption and emission values.

In a possible embodiment, the vehicle analysis system 100 comprises an arrangement 104 for interfacing with and collecting the vehicle diagnosis data. The arrangement 104 may for example include means for allowing the collected data to be serialized and further provided to a local computing device 106, the local computing device 106 possibly connected to a local database 108 for storage of the collected vehicle diagnosis data.

In one embodiment the local computing device 106 may be adapted to perform performed modeling based on the collected vehicle diagnosis data, with the purpose of finding a behavioral pattern relating to at least one of the vehicle components comprised with the vehicle. Furthermore, pattern recognition algorithms can be applied by the local computing device 106 to attempt to identify and classify patterns the collection of vehicle diagnosis data. As mentioned above, the vehicle diagnosis data preferably is collected over time, forming a time series of vehicle diagnosis data. In an embodiment, the local database 108 may be provided with training data to be used in a comparison process for determining a status of at least one of the vehicle components.

Preferably, the local computing device 106 may be connected to a network, such as the Internet 110, allowing the local computing device 106 to communicate and exchange information with e.g. a remotely located server 112, having a thereto connected remote database 114. The remotely located server 112 may be arranged to receive vehicle diagnosis data from a plurality of local computing devices (such as local computing device 106), having collected data relating to an individual thereto connected vehicle. The remotely located server 112 may be adapted to at least a portion of all of the data collected in relation to a plurality of vehicles, for identifying behavioral patterns, including status indications for vehicle components.

Figure 2:
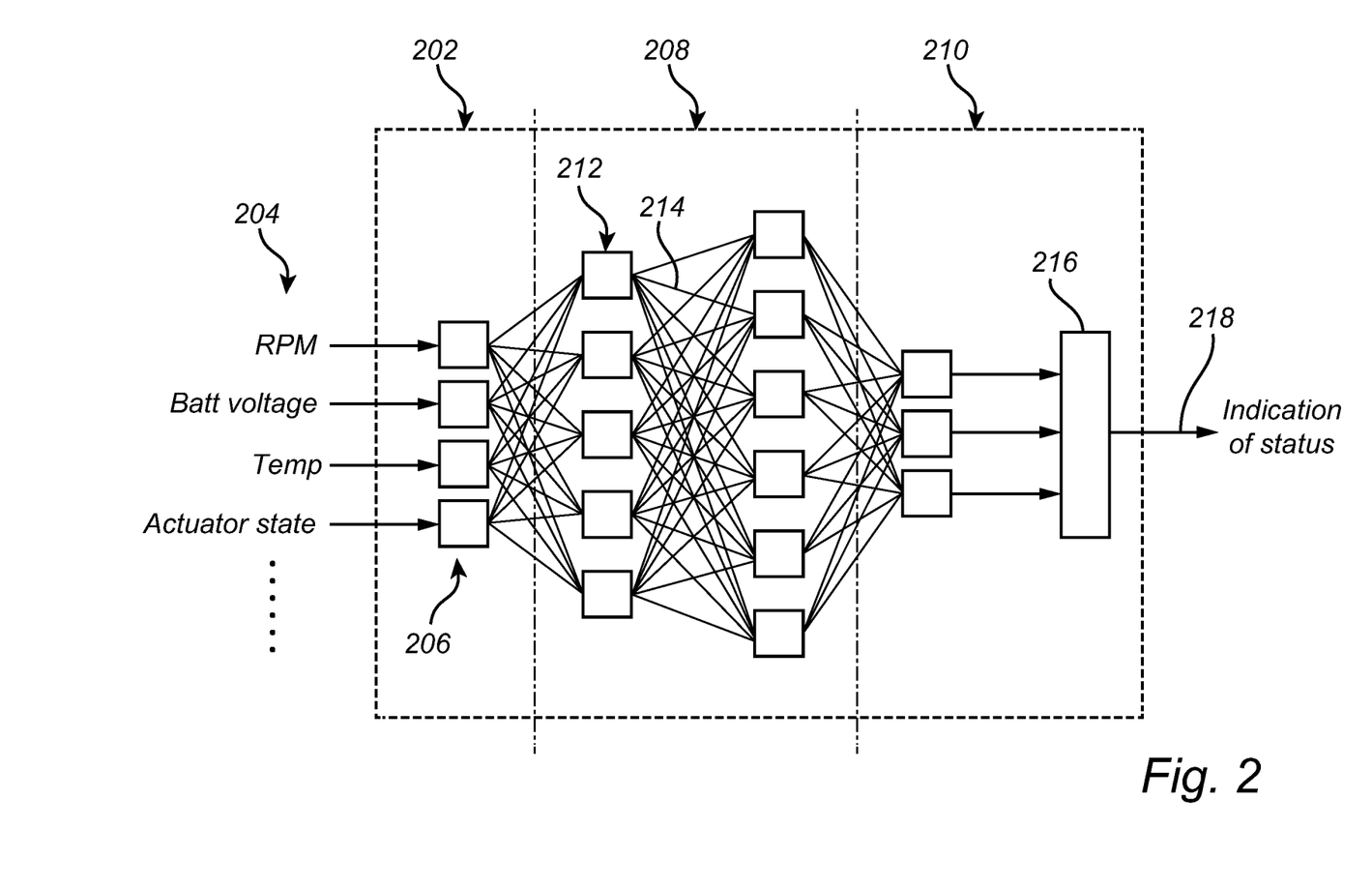
FIG. 2 schematically illustrates a pattern recognition methodology applicable in accordance with the invention for analysis of vehicle diagnosis data.

With further reference to FIG. 2, there is shown a possible approach of implementing a pattern recognition methodology/correlation for determining said indication of the status of a vehicle component. FIG. 2 specifically shows a block diagram of one example of a neural network used for determining an indication of a status of a vehicle component, exemplified as an actuator comprised with the vehicle 102. The process of determining the status may be programmed to periodically investigate the status of the actuator, or when an indication is made (for example due to a driver communicating the same to the workshop).

The block diagram includes an input layer 202, configured to receive various inputs from the sensors inputs 204 generating vehicle diagnosis data in relation to the vehicle components comprised with the vehicle 102. The vehicle diagnosis data is provided in parallel, illustrated as relating to engine revolutions, the intermediate voltage of a battery comprised with the vehicle, a temperature (in the vicinity of the actuator), an intermediate actuator state, etc. Accordingly, further pieces of vehicle diagnosis data may be provided as input to the correlation process. The input layer 202 includes nodes 206 associated with each of the inputs 202. The neural network also includes one or more hidden layers 208 and an output layer 210. Nodes 206 of input layer 202 communicate with one or more nodes 90 of hidden layers 208 via connections 214. During training of the network, the various connections along with associated weights are determined. A block 216 represents a polynomial function of its inputs to generate the indication of the status for the vehicle components as an output 218. The degree of the polynomial employed in block 216 is constrained to be one less than the number of nodes in output layer 210.

It should be recognized that the number and structure of nodes for each layer will vary depending upon the particular indication of status that is being determined, whereby the illustration in FIG. 2 is just provided as an example. Accordingly, in some network designs, more than one hidden layer is used, although only rarely will more than two such layers appear. There are of course many other variations of the neural network architecture illustrated above. For the purposes herein, therefore, "neural network" can be defined as a system wherein the data to be processed is separated into discrete values which are then operated on and combined in at least a two stage process and where the operation performed on the data at each stage is in general different for each discrete value and where the operation performed is at least determined through a training process. A different operation here is meant any difference in the way that the output of a neuron is treated before it is inputted into another neuron such as multiplying it by a different weight or constant.

Figure 3A:
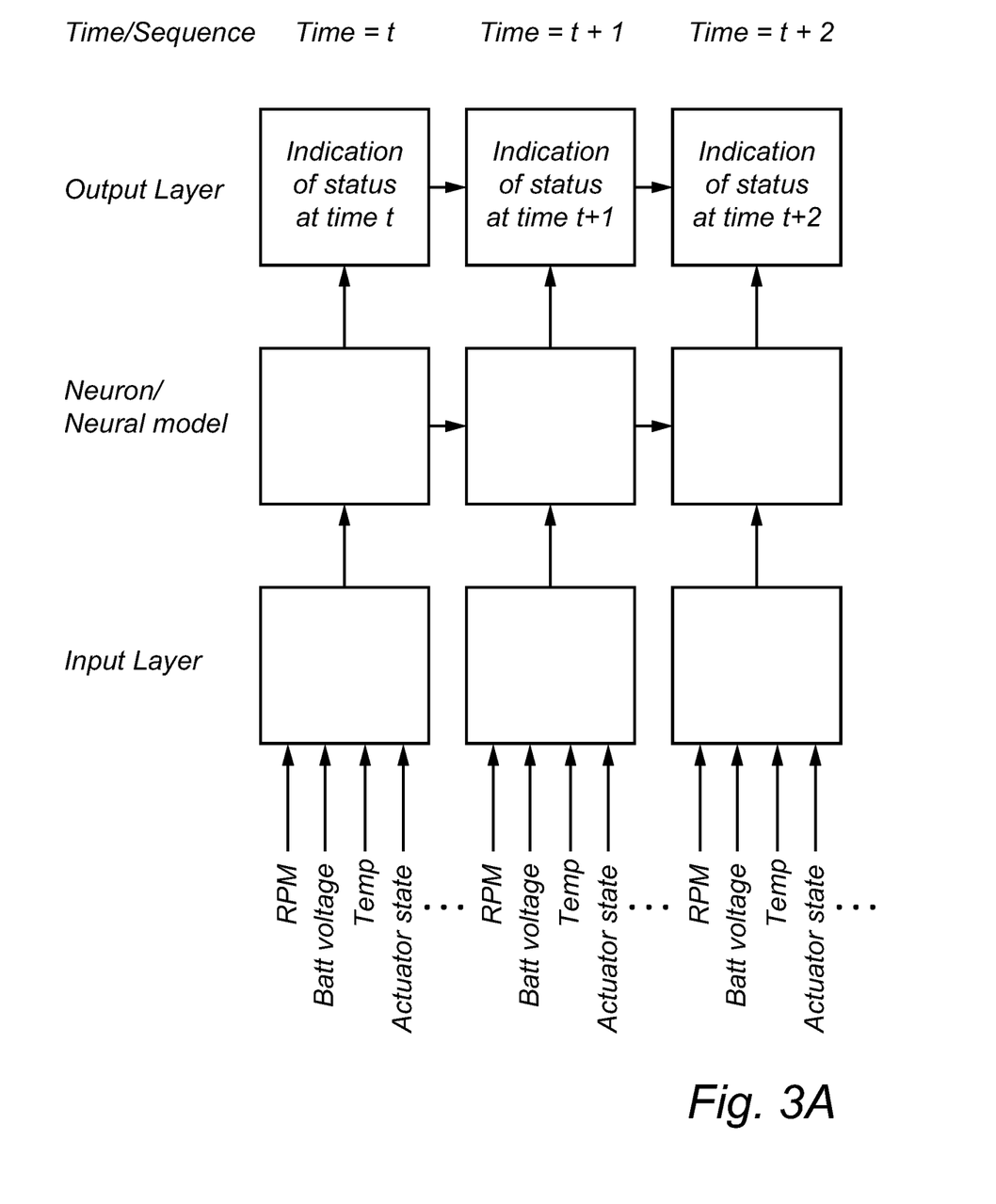
FIGS. 3A and 3B provides alternative neural network approaches for use in accordance to the inventive method.
Figure 3B:
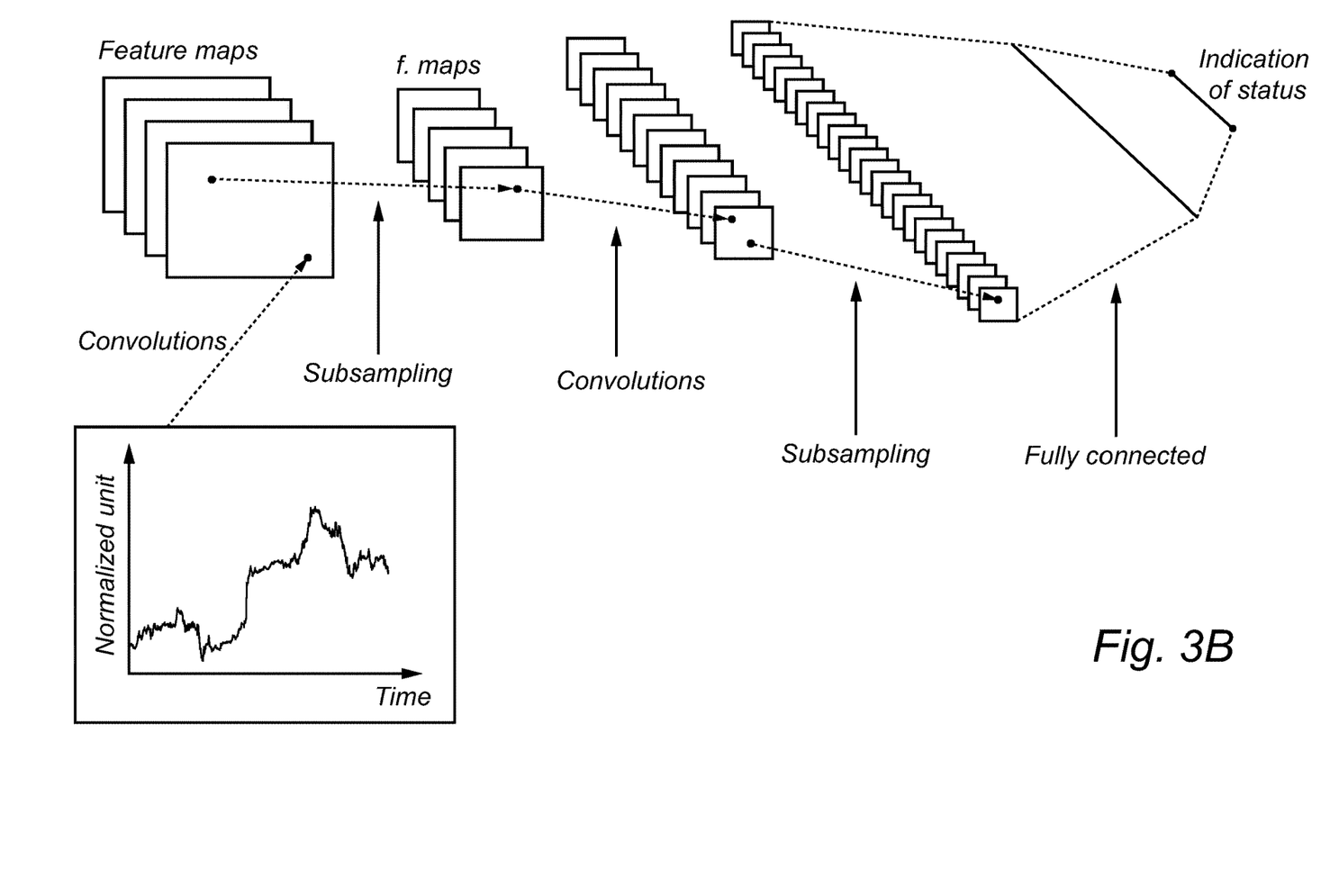

As is illustrated in FIGS. 3A and 3B and in line with FIG. 2, it may alternatively be possible to use at least one of a convolutional neural network (CNN) and a recurrent neural network (RNN), such as a long short-term memory (LSTM) neural network for determining said indication of the status for the at least one vehicle component comprised with the vehicle.

Figure 4:
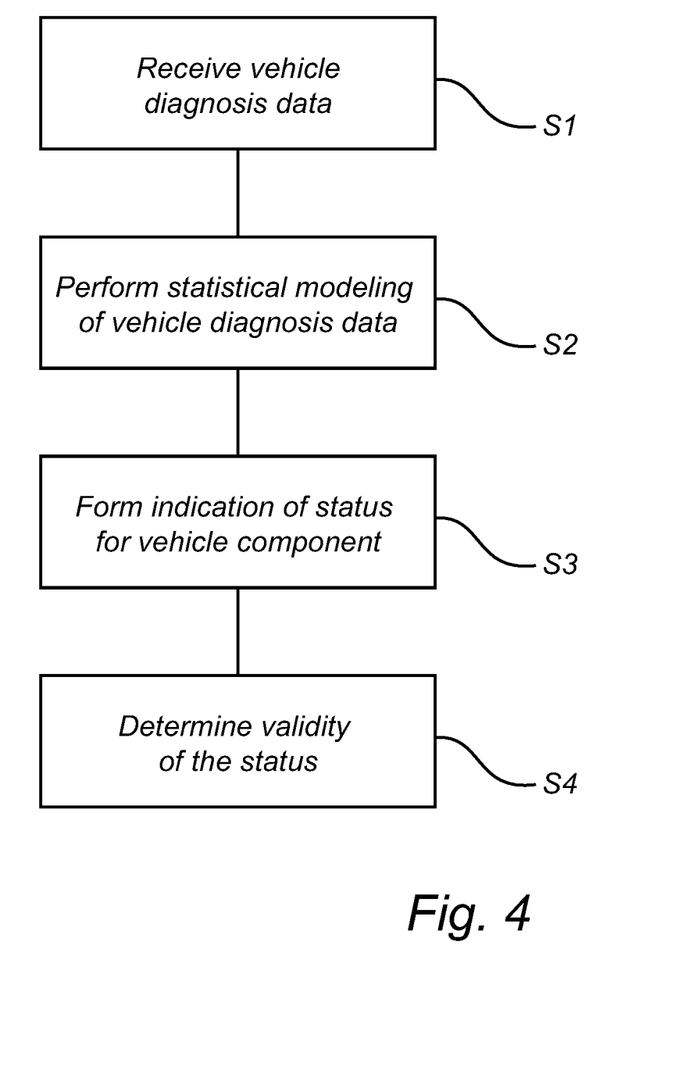
FIG. 4 is a flow chart illustrating the steps of performing the method according to a currently preferred embodiment of the invention.

In summary, the present invention relates to a method for analyzing vehicle diagnosis data generated by a first vehicle, the method comprising receiving, S1, a first collection of vehicle diagnosis data, the vehicle diagnosis data comprising a plurality of different sets of digital data representing a plurality of vehicle components comprised with the vehicle, S2, performing a modeling of the first collection of vehicle diagnosis data by correlating at least selected portion of the different sets of data comprised with the first collection of vehicle diagnosis data, forming, S3, based on the performed modeling, an indication of a status for at least one of the vehicle components comprised with the vehicle and determining, S4, a validity of the status for the at least one vehicle component. By means of the present invention, the correlation between vehicle data from different vehicle components is exploited for understanding the behavior of a specific vehicle component. Accordingly, rather than only relying on a single e.g. error code relating to a specific vehicle component, the overall behavior for a plurality of vehicle components is taken into account for determining an indication of a status for a single vehicle component.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for analyzing vehicle diagnosis data generated by a vehicle, the method comprising:
    receiving a first collection of vehicle diagnosis data, the vehicle diagnosis data comprising a plurality of different sets of digital data representing a plurality of different vehicle components comprised with the vehicle, wherein the different sets of digital data representing the plurality of different vehicle components are generated from a CAN bus information flow;
    performing a modeling of the first collection of vehicle diagnosis data by correlating at least a selected portion of the different sets of digital data comprised with the first collection of vehicle diagnosis data, wherein the modeling comprises applying a machine learning process to the selected portion of the different sets of digital data and wherein the selected portion of the different sets of digital data is identified from the first collection of vehicle diagnosis data by utilizing pattern recognition;
    forming, based on the performed modeling, an indication of a status for a single one of the vehicle components comprised with the vehicle based on an identified pattern provided as an outcome of the pattern recognition, wherein the indication of the status for the single one of the vehicle components relates to an error relating to that vehicle component;
    determining a validity of the status for the single one of the vehicle components; and
    outputting the indication in combination with the validity of the status, wherein the validity comprises information stating if the indication is to be treated as reliable or unreliable.

2. The method according to claim 1, wherein the validity of the status for the single one vehicle component is determined to be above a predetermined threshold.

3. The method according to claim 1, wherein the indication of the status for the single one vehicle component relates to at least one of a short-circuit, a broken connection, and a corrosion in a connector.

4. The method according to claim 1, wherein the machine learning process is an unsupervised machine learning process or a supervised machine learning process.

5. The method according to claim 1, wherein the performed modeling comprises:
    accessing a digital storage unit comprising a previously stored collection of training vehicle diagnosis data; and
    comparing the collection of training vehicle diagnosis data with the first collection of vehicle diagnosis data.

6. The method according to claim 5, wherein the training vehicle diagnosis data comprises at least one of:
    a second collection of vehicle diagnosis data generated by a second vehicle, the second vehicle being different from the vehicle; and
    an expected collection of vehicle diagnosis data.

7. The method according to claim 6, wherein the expected collection of vehicle diagnosis data is generated from a behavioral simulation of a vehicle.

8. The method according to claim 1, wherein the machine learning process is based on a convolutional neural network (CNN) or a recurrent neural network (RNN).

9. A vehicle analysis system for analyzing vehicle diagnosis data generated by a vehicle, the system comprising one or more processors configured to:
    receive a first collection of vehicle diagnosis data, the vehicle diagnosis data comprising a plurality of different sets of digital data representing a plurality of different vehicle components comprised with the vehicle, wherein the different sets of digital data representing the plurality of different vehicle components are generated from a CAN bus information flow;
    perform a modeling of the first collection of vehicle diagnosis data by correlating at least a selected portion of the different sets of data comprised with the first collection of vehicle diagnosis data, wherein the modeling comprises applying a machine learning process to the selected portion of the different sets of digital data and wherein the selected portion of the different sets of digital data is identified from the first collection of vehicle diagnosis data by utilizing pattern recognition;
    form, based on the performed modeling, an indication of a status for a single one of the vehicle components comprised with the vehicle based on an identified pattern provided as an outcome of the pattern recognition, wherein the indication of the status for the single one of the vehicle components relates to an error relating to that vehicle component;
    determine a validity of the status for the single one of the vehicle components; and
    output the indication in combination with the validity of the status, wherein the validity comprises information stating if the indication is to be treated as reliable or unreliable.

10. The vehicle analysis system according to claim 9, further comprising an arrangement for interfacing with and collecting the vehicle diagnosis data.

11. The vehicle analysis system according to claim 9, further comprising a display unit comprising a graphical user interface (GUI), wherein the GUI is configured for presenting the indication of the status for the single one of the vehicle components comprised with the vehicle.

12. A computer program product comprising a non-transitory computer readable medium having stored thereon computer program means for controlling a vehicle analysis system, wherein the computer program product comprises:
- code for receiving a first collection of vehicle diagnosis data, the vehicle diagnosis data comprising a plurality of different sets of digital data representing a plurality of different vehicle components comprised with the vehicle, wherein the different sets of digital data representing the plurality of different vehicle components are generated from a CAN bus information flow;
- code for performing a modeling of the first collection of vehicle diagnosis data by correlating at least a selected portion of the different sets of data comprised with the first collection of vehicle diagnosis data, wherein the modeling comprises applying a machine learning process to the selected portion of the different sets of digital data and wherein the selected portion of the different sets of digital data is identified from the first collection of vehicle diagnosis data by utilizing pattern recognition;
- code for forming, based on the performed modeling, an indication of a status for a single one of the vehicle components comprised with the vehicle based on an identified pattern provided as an outcome of the pattern recognition, wherein the indication of the status for the single one of the vehicle components relates to an error relating to that vehicle component;
- code for determining a validity of the status for the single one of the vehicle components; and
- code for outputting the indication in combination with the validity of the status, wherein the validity comprises information stating if the indication is to be treated as reliable or unreliable.

13. An arrangement for collection of vehicle diagnosis data from a vehicle, including:
- at least one processor;
- an interface configured for providing an electrical connection between the vehicle and the at least one processor; and
- a memory for storing vehicle diagnosis data collected from the vehicle, wherein the interface is arranged to collect a plurality of analog signals from the vehicle and the arrangement further comprises an analogue-to-digital converter to allow for parallel digitizing of the plurality of analogue signals, and the arrangement is comprised with the vehicle analysis system according to claim 9.

14. The arrangement according to claim 13, further comprising a serializer configured to convert the plurality of digitized signals to a serial stream of data, and the serializer is a low-voltage differential signaling (LVDS) serializer.

15. The arrangement according to claim 13, further comprising a further communication interface for providing the stored vehicle diagnosis data to a remotely arranged computing device.

16. The arrangement according to claim 13, wherein the plurality of components comprised with the arrangement are arranged in a housing, wherein the arrangement is further adapted for use in a vehicle workshop.

17. The arrangement according to claim 13, wherein the plurality of components comprised with the arrangement are comprised with the vehicle as an on-board arrangement.

* * * * *